Nov. 28, 1967     J. H. BRUMFIELD     3,355,219
WHEEL COVER RETAINING MEANS
Filed April 9, 1965
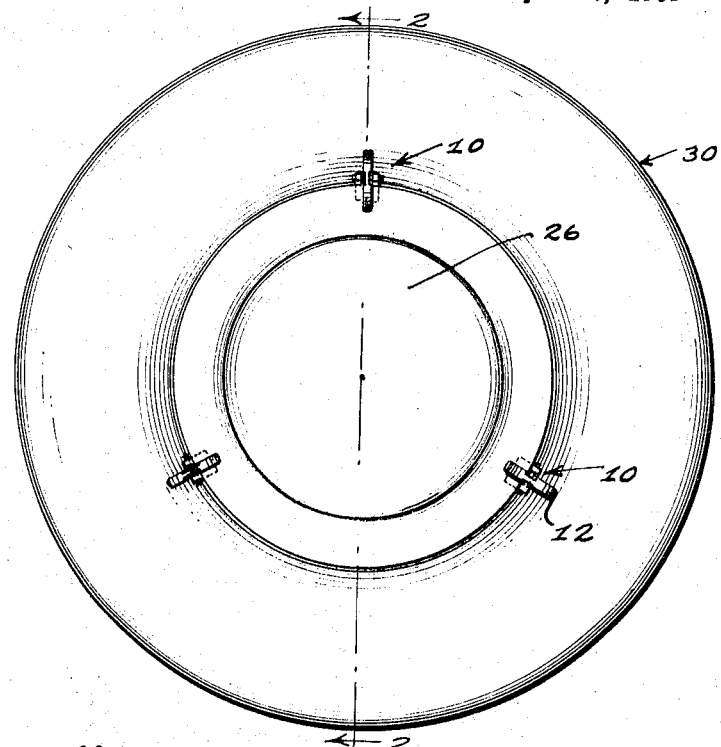
Fig. 1
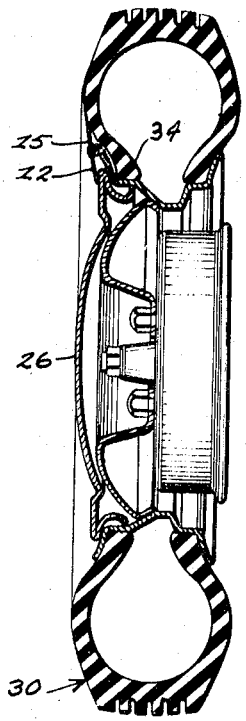
Fig. 2
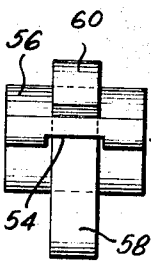
Fig. 8
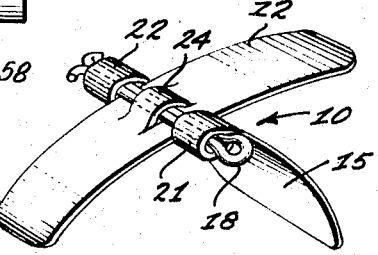
Fig. 3
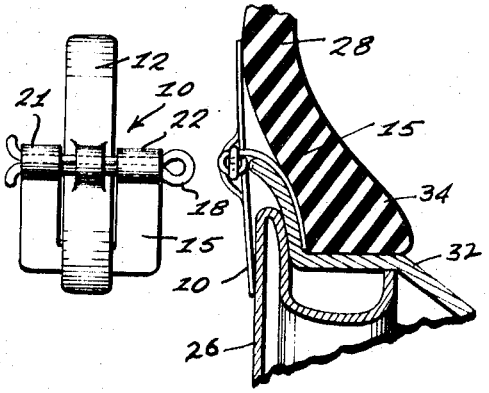
Fig. 4
Fig. 5
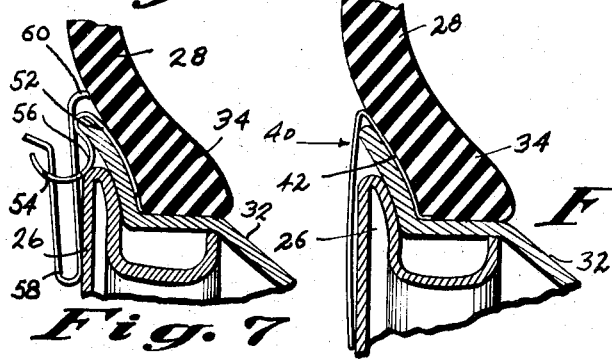
Fig. 7     Fig. 6
INVENTOR.
JOHN HENRY BRUMFIELD
BY *Richard W. Hansen*
ATTORNEY

United States Patent Office 3,355,219
Patented Nov. 28, 1967

3,355,219
WHEEL COVER RETAINING MEANS
John Henry Brumfield, 3900 N. Weber,
Colorado Springs, Colo. 80907
Filed Apr. 9, 1965, Ser. No. 446,908
4 Claims. (Cl. 301—37)

The present invention relates to automotive assessories and more particularly to means for retaining wheel covers or "hub caps" on the wheel.

More advanced design styles for automobiles have created an increasing number of high style and expensive wheel covers. Contrary to the more traditional concept of a simple cap member to conceal the hub of a wheel, the wheel cover of the present art represents a substantial portion of the overall appearance of the late model automobiles. The patterns of the wheel covers have become complex and result in a substantial cost per unit. In addition to factory equipment wheel covers, custom covers are finding a large market and are even more expensive, making the loss of such covers financially burdensome.

It is therefore the object of the present invention to provide means for keeping wheel covers in place on the wheels of an automobile despite high speeds, rough roads or encountered conditions of mud and snow.

A second object of the invention is to provide a device of the type described which is inexpensive to produce and is simple to install.

Other and further objects, features and advantages of the invention will become apparent or specifically pointed out as the description proceeds in conjunction with the accompanying drawings in which:

FIGURE 1 is a side elevational view of an automobile wheel and tire with the retainer means of the present invention mounted on the wheel in operative position.

FIGURE 2 is a cross-sectional view taken along lines 2—2 in FIGURE 1.

FIGURE 3 is an enlarged perspective view of the retainer means of the present invention.

FIGURE 4 is a front elevational view of the said retainer means.

FIGURE 5 is an enlarged fragmentary cross-sectional view of a wheel rim showing the retaining means in place and secured between the wheel rim and tire bead.

FIGURE 6 is an enlarged fragmentary cross-sectional view of a wheel rim showing a modified form of the retainer means secured in place.

FIGURE 7 is an enlarged fragmentary cross-sectional view of a wheel rim showing a second modified form of the retainer means secured in place.

FIGURE 8 is a front view of the species of retainer means shown in FIGURE 7.

Briefly, the invention comprises a springable leaf member which is secured to the wheel of an automobile by a retainer so as to overlie a portion of the outer margin of the wheel cover. A plurality of such members are equispaced around the wheel and are each held in place by a clip pinched between the wheel rim and the tire bead.

Referring now to the drawings for a more detailed description of the apparatus of the present invention, the preferred form of the retainer is seen in FIGURES 3 and 4 and is identified generally by reference numeral 10. The retainer 10 includes a springable steel leaf 12 which is pivotally secured to the bifurcated clip 15 by means of a cotter key 18 which passes through a raised cut out 24 located centrally on the steel leaf 12 and a pair of opposing eyes 21 and 22 formed in the forked ends of the clip 15. As seen in FIGURES 1, 2 and 5, the longitudinal axis of the leaf 12 is radially positioned on the wheel so that the leaf 12 will overlie a portion of the wheel cover 26 and the inside margin of the side wall 28 of the tire 30. With at least three of the retaining leaves equispaced around the perimeter of the wheel cover, it is impossible for the cover to be removed by any means other than the removal of the clips and leaves. Each of the clips 15 is curved to conform to the contour of the inside surface of the wheel rim so that when the tire 30 is inflated, the bead 34 of the tire will bear against the clip 15 and press it tightly against the inside of the rim to secure it in place.

A modified form of the retainer device 40 is shown in FIGURE 6. Constructed from a single blank of steel, the retainer includes one leg 42 which is adapted to be positioned between the wheel rim 32 and the tire bead 34 and held therebetween in the same manner as the clip 15 in the preferred embodiment. The material forming the leg 42 is bent back upon itself forming an acute angle and a second leg 44 which may be extended radially over the outer edge of the wheel hub cap to secure the cap in its position. Preferably, the material forming the retainer member 40 is springable and exerts an inwardly directed force on the cap 28.

A third form of the device is illustrated in FIGURE 7. Retainer means are formed by a curved clip 52 which is formed to fit the contour of the inside of the wheel rim and which is rolled into a semi-circular form at the point at which it emerges from the wheel rim. An elongated aperture 54, located centrally of the rolled end 56 of the clip, serve to journal a springable leaf 58. Preferably, the leaf 58 is formed of spring steel bent back upon itself in order that it will bear against the sides of the aperture with sufficient force to hold it in place, even when not in use. The inside half of the leaf is turned down at its ends to form a stub 60 which bears against the side wall 28 of the tire. As the tire is inflated, the stub end is pressed outwardly compressing the spring portion of the leaf 58, thus exerting greater pressure of the leaf on the hub cover 26. Removal of the leaf can be accomplished by pinching the two sides together and pulling the leaf through the aperture 54.

Having thus described the several useful and novel features of the wheel cover retaining means of the present invention in connection with the accompanying drawings, it will be seen that the many worthwhile objectives for which it was designed have been achieved. Although but a few of the several possible embodiments of the invention have been illustrated and described herein. I realize that certain additional modifications may well occur to those skilled in the art within the broad teaching hereof; hence it is my intention that the scope of protection afforded hereby shall be limited only insofar as said limitations are expressly set forth in the appended claims.

I claim:
1. In combination with a vehicle wheel, comprising;
   a rim attached to the wheel;
   a pneumatic tire having a bead and mounted on said rim;
   a wheel hub cover mounted on one side of said wheel;
   a clip member disposed between said tire bead and the said rim; and
   a retainer member carried by said clip which extends over the outer edge of said hub cover and bears against the outside surface thereof and extends radially of the wheel rim and bears against the side wall portion of the said pneumatic tire.
2. The combination of claim 1 wherein said clip member includes a bifurcated end and an eye in each side of the fork; and further includes;
   a springable leaf member having an eye forming raised center portion and disposed between the forks of the said clip; and
   pin means disposed in the eyes of the fork and the eye of the leaf member so as to pivotally mount the leaf on the clip.

3. The combination of claim 1 wherein said clip member includes a pair of spaced apart spring legs, one of which is provided with an aperture and is formed in a substantial semi-circle bent back upon itself; and further includes;
  a generally U-shaped springable retainer means disposed within the said aperture and retained therein by the mutually outward spring pressure of the said two legs.

4. In combination with a vehicle wheel, comprising;
  a rim attached to the wheel;
  a pneumatic tire having a bead and mounted on said rim;
  a wheel hub cover mounted on one side of said wheel;
  a clip member disposed between said tire bead and the said rim, said clip having a bifurcated end; and
  a springable retainer member pivotally mounted on the clip and carried intermediate the forked portions of the bifurcated end of the clip, said retainer member extending radially of the wheel rim and extending over the said wheel hub cover and a portion of the side wall of the tire.

References Cited
UNITED STATES PATENTS

| | | | |
|---|---|---|---|
| 1,985,378 | 12/1934 | Lyon | 301—37 |
| 2,351,655 | 6/1944 | Aske | 301—37 |
| 2,394,958 | 2/1946 | Wood | 301—37 |
| 2,455,151 | 11/1948 | Wood | 301—37 |
| 2,469,997 | 5/1949 | Simpson | 301—5 |
| 2,749,184 | 6/1956 | Wood | 301—37 |
| 2,526,026 | 10/1950 | Horn | 301—37 |
| 2,926,959 | 3/1960 | Lyon | 301—37 |
| 3,036,867 | 5/1962 | Lyon | 301—37 |

LEO FRIAGLIA, *Primary Examiner.*

RICHARD J. JOHNSON, *Examiner.*